(12) United States Patent
McPheeters et al.

(10) Patent No.: US 10,890,205 B2
(45) Date of Patent: Jan. 12, 2021

(54) WATERTIGHT FASTENING DEVICES EMPLOYED IN A SOLAR PANEL INSTALLATION SYSTEM

(71) Applicant: Sunrun South LLC, San Luis Obispo, CA (US)

(72) Inventors: Greg McPheeters, Santa Clara, CA (US); Andrew Wickham, Santa Margarita, CA (US); Geno Viscuso, Shingle Springs, CA (US)

(73) Assignee: Sunrun Inc., San Francisco, CA (US)

( * ) Notice: Subject to any disclaimer, the term of this patent is extended or adjusted under 35 U.S.C. 154(b) by 725 days.

(21) Appl. No.: 15/690,965

(22) Filed: Aug. 30, 2017

(65) Prior Publication Data

US 2019/0063481 A1    Feb. 28, 2019

(51) Int. Cl.
*F24S 25/61* (2018.01)
*F16B 33/00* (2006.01)
*F24S 25/00* (2018.01)
*F24S 40/44* (2018.01)
*F24S 25/60* (2018.01)

(52) U.S. Cl.
CPC ............ *F16B 33/004* (2013.01); *F24S 25/00* (2018.05); *F24S 25/61* (2018.05); *F24S 40/44* (2018.05); *F24S 2025/014* (2018.05); *F24S 2025/021* (2018.05); *F24S 2025/022* (2018.05); *F24S 2025/6006* (2018.05)

(58) Field of Classification Search
CPC ....... F16B 33/004; F16B 43/001; F24S 25/60; F24S 25/61; F24S 2025/021; F24S 2025/6005
See application file for complete search history.

(56) References Cited

U.S. PATENT DOCUMENTS

| | | | | |
|---|---|---|---|---|
| 3,141,532 A | * | 7/1964 | Runyan | E04D 3/3606 52/105 |
| 3,247,752 A | * | 4/1966 | Greenleaf | F16B 43/001 411/542 |
| 3,469,490 A | * | 9/1969 | Pearce | F16B 33/004 411/371.1 |

(Continued)

FOREIGN PATENT DOCUMENTS

| | | | | |
|---|---|---|---|---|
| EP | 2 726 797 | * | 4/2016 | F24J 2/52 |
| WO | WO 00/05509 | * | 2/2000 | F16B 43/00 |
| WO | WO 2015/016987 | * | 2/2015 | E04D 13/00 |

*Primary Examiner* — Michael P Ferguson
(74) *Attorney, Agent, or Firm* — Kramer Levin Naftalis & Frankel LLP

(57) ABSTRACT

Watertight fastening devices and systems and methods for the employment thereof are disclosed. The disclosed watertight fastening device includes a head, a shank extending away from the head toward a distal end, and a cover extending outwardly and away from the head in the direction of the shank and defining a hollow region between the shank and an inner surface of the cover. The watertight fastening device may be used in conjunction with a solar power installation system that includes a base plate configured to be positioned against an installation surface. The base plate includes an aperture for receiving the shank of the fastener and protrusion surrounding the aperture configured to be received in the hollow region of the fastener, thereby providing an enhanced barrier against moisture reaching the installation surface.

8 Claims, 7 Drawing Sheets

(56) References Cited

U.S. PATENT DOCUMENTS

| | | | | |
|---|---|---|---|---|
| 4,321,745 | A * | 3/1982 | Ford | E04D 13/1407 29/525.04 |
| 8,209,914 | B2 * | 7/2012 | Stearns | E04D 13/10 52/58 |
| 2011/0179727 | A1 * | 7/2011 | Liu | F24S 25/30 52/173.3 |
| 2012/0233958 | A1 * | 9/2012 | Stearns | E04G 21/328 52/708 |
| 2013/0087138 | A1 * | 4/2013 | Ubach Cartategui | F24S 25/60 126/696 |

\* cited by examiner

WATERTIGHT FASTENING DEVICES EMPLOYED IN A SOLAR PANEL INSTALLATION SYSTEM

PLACE PRIORITY HERE

This application claims the benefit of U.S. Provisional Patent Application Ser. No. 62/381,175, filed Aug. 30, 2016, which is incorporated by reference herein in its entirety.

BACKGROUND OF THE DISCLOSURE

Building-mounted structures are typically secured to a building surface with one or more fastening devices. Such fastening devices often penetrate the building surface in order to adequately secure the structure to the building. For example, solar panel installations can be secured to rooftop surfaces by penetrating the roof surface with screws or other fasteners. Adequately securing the solar panel installation to the surface is critical to protect the panels and surrounding property. Penetrating the installation surface, however, can lead to various adverse issues including the ingress of moisture.

SUMMARY OF THE DISCLOSURE

Watertight fastening devices and a system and a method for the employment thereof are disclosed. The disclosed watertight fastening devices provide a watertight mounting point for a building-mounted structure such as, for example, a solar panel installation system. The disclosed watertight fastening devices may also secure, in a water-tight fashion, a component, such as a component of a solar panel installation system, to a surface.

In some embodiments, the watertight fastening device includes a head, a threaded shank, and a cover extending outwardly and away from the head to form a hollow space to accept a protrusion when the device is tightened against an installation surface. The interaction between the cover and the protrusion can serve to promote a watertight fit between the fastener and the installation surface. In further embodiments, a threaded stud may extend away from the head in a direction opposing the threaded shank.

In some embodiments, watertight fastening devices may be used to secure one or more components of a solar panel system to an installation surface. The solar panel system may include a base plate positioned against the installation surface, a mounting component, such as a rail or L-foot, for supporting the other components of the solar panel system, and a watertight fastening device for securing the mounting component and the base plate to the installation surface. The base plate may include the protrusion that interacts with the cover of the watertight fastener, which, in turn, secures the mounting component to the installation surface.

In some embodiments, a method for employing the watertight fastening device in the solar panel installation system is provided. The method may include providing a watertight fastener that includes a head, a shank, and a cover, positioning a base plate against an installation surface, inserting an end of the shank, distal from the head, into an aperture of the base plate, and subjecting the watertight fastener to a tightening force that secures the faster to the installation surface through the aperture. In some embodiments, a protrusion that surrounds the aperture may be formed in the base plate prior to positioning the base plate against the installation surface. In other embodiments, the protrusion may be formed as a result of driving the watertight faster into the installation surface. The method may be repeated for any suitable number of watertight fastening devices.

BRIEF DESCRIPTION OF THE DRAWINGS

For a fuller understanding of the inventive embodiments, reference is made to the following description taken in connection with the accompanying drawings in which.

DETAILED DESCRIPTION OF THE PREFERRED EMBODIMENTS

Reference will now be made in detail to the embodiments of the present invention, examples of which are illustrated in the accompanying drawings. Various aspects of the above referenced methods and systems are described in details herein below by way of examples, rather than by way of limitation.

Figure 1A:
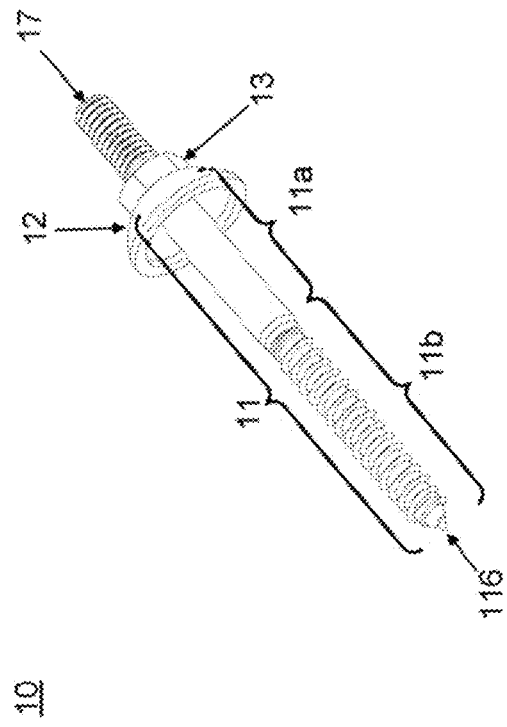
FIG. 1A illustrates a perspective view of a watertight fastening device, in accordance with some embodiments.
Figure 1B:
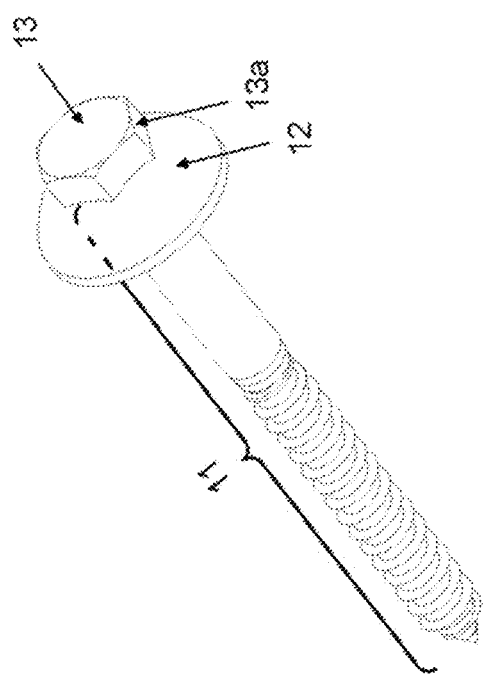
FIG. 1B illustrates a side view of the watertight fastening device of FIG. 1A, in accordance with some embodiments.
Figure 1D:
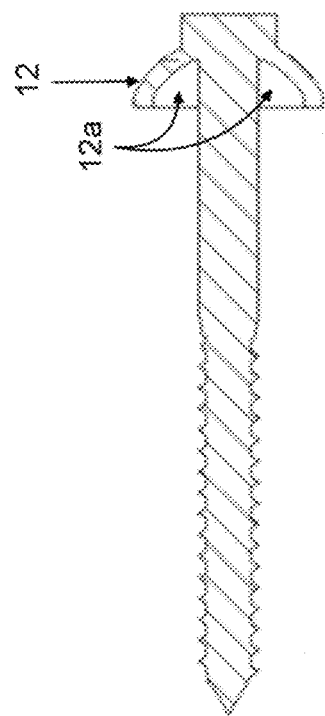
FIG. 1D illustrates a perspective view of another watertight fastening device, in accordance with some embodiments.
Figure 1C:
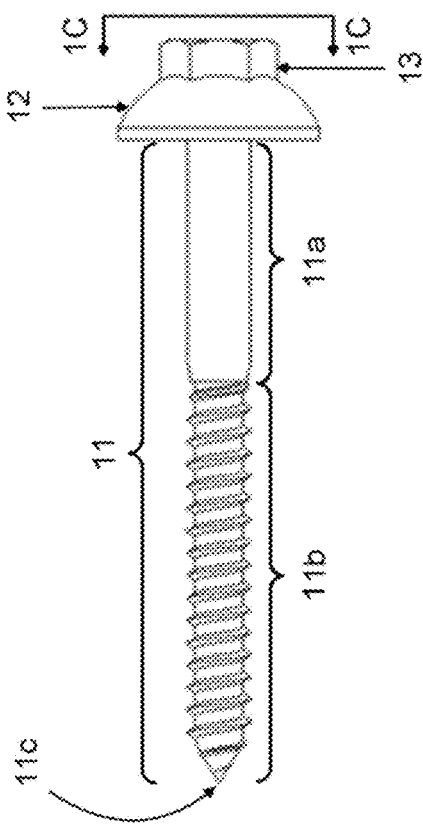
FIG. 1C illustrates a cross-sectional view of the watertight fastening device of FIG. 1A, in accordance with some embodiments.

FIGS. 1A-1C illustrate perspective, side, and cross-sectional views, respectively, of watertight fastening device 10, in accordance with some embodiments. In one configuration, watertight fastening device 10 could include shank 11, cover 12, and head 13. In a second configuration, a mounting component, such as threaded stud 17 shown in FIG. 1D, may extend away from head 13 to provide a mounting point to facilitate the installation of one or more component of a solar panel system.

Watertight fastening device 10 can be used in many different applications to secure a component used in in the installation of solar panel modules to a surface in a watertight manner. As shown below in FIGS. 3A-7B, watertight fastening device 10 may be used to attach portions of a solar mounting system (e.g., a mount, a track, junction box, an anchor, a raised mount, an electrical component, a junction box, etc. . . . ) to an installation surface (e.g., a roof). Watertight fastening device 10 may be used in similar fashion as typical lag screws or lag bolts.

Shank 11 can includes unthreaded portion 11a, threaded portion 11b, and tip 11c. Unthreaded portion 11a may be generally cylindrical in shape and extend between head 13 and threaded portion 11b. Threaded portion 11b may extend from unthreaded portion 11a to tip 11c and may be of a generally helical shape. Threaded portion 11b may be used to mate with a complementary thread or cut a helical groove into a softer material when watertight fastening device 10 is inserted into an installation surface. Tip 11c may be flat or pointed depending on the type of installation surface. For example, a pointed tip might be used to penetrate a softer surface material when watertight fastening device 10 is inserted where a flat tip might be used to mate watertight fastening device with a pre-threaded bore.

Cover 12 may be positioned between shank 11 and head 13 and may be designed to shield an underlying surface from environmental and/or meteorological elements. Cover 12 may come in a variety of shapes, such as the dome shape as illustrated in FIGS. 1A-1D, for example. In other embodiments, cover 12 may be conical, cylindrical, or multi-sided (e.g., square-shaped, hex-shaped, triangle-shape, pyramid-shape, etc.). The exterior of cover 12, when formed into a dome or conical shape, may have a rounded appearance. In some embodiments, cover 12 with multiple sides may have two or more planar walls. For example, a square-shaped cover 12 may have four walls.

The interior wall of cover 12 defines a hollow region 12a between cover 12 and shank 11. Hollow region 12a may be designed to accept, envelope, enclose, and/or otherwise receive a protrusion of a base plate. As discussed below, this protrusion may be integrally or separately formed with the rest of the base plate and may be pre-formed or formed in the process of tightening watertight fastening device 10 against an installation surface.

In some embodiments, cover 12 may contact the installation surface directly (i.e. without an underlying base plate) to provide a water-tight seal that protects the surface from ingress of moisture, such as rain water on a roof. In some embodiments, a seal, gasket, or other similar moisture-blocking insert may be placed between cover 12 and the surface with which cover 12 contacts (whether the installation surface, a base plate, or other underlying surface) to provide an additional layer of protection.

Head 13 may be utilized to drive or turn watertight fastening device 10 into an installation surface using a fastening tool, such as a wrench, a hex driver, or a screwdriver, for example. For example, head 13 may have a number of flat edges 13a that can be held with a tool while watertight fastening device 10 is coupled to the surface, as a suitable tool (e.g., a wrench) can serve to increase the amount of torque that can be applied to head 13, thereby facilitating a close and water-tight fit. As shown, head 13 may be hexagonally shaped. In some embodiments, head 13 may also come in a variety of shapes, including and not limited to, square, flanged, or rounded. In some embodiments, head 13 may include a screw head profile for receiving a torqueing tool, such as a screwdriver or hex key wrench, for example.

Threaded stud 17 may extend from head 13 in a direction opposing shank 11 to facilitate the installation of various types of solar panel system components. In some embodiments, head 13 could include a threaded aperture for threadably receiving threaded stud 17, while in other embodiments head 13 may be integrally formed with threaded stud 17.

Figure 2:
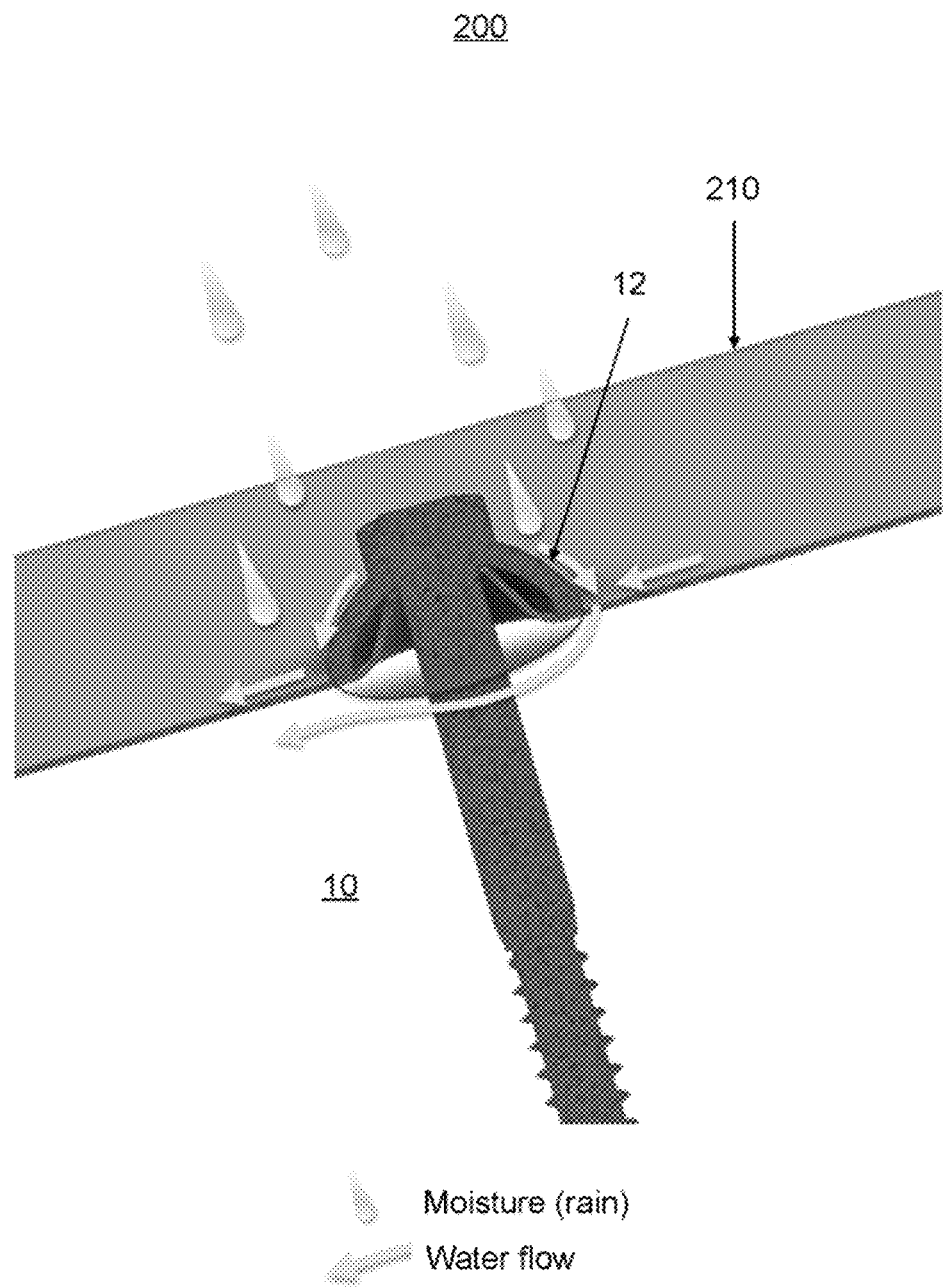
FIG. 2 illustrates a graphic representation that depicts the flow of rain water with respect to the watertight fastening devices, in accordance with some embodiments.

FIG. 2 illustrates a graphic representation of solar panel installation system 200, in accordance with some embodiments. System 200 includes base plate 210 secured to an installation surface (not shown) using watertight fastening device 10. As shown, when rain falls onto base plate 210, water is prevented from flowing under cover 12 of watertight fastening device 10. Instead, water is directed around cover 12, thereby preventing moisture from entering under the cover and penetrating the installation surface at the location where the watertight fastening device 10 penetrates the installation surface.

Figure 3A:
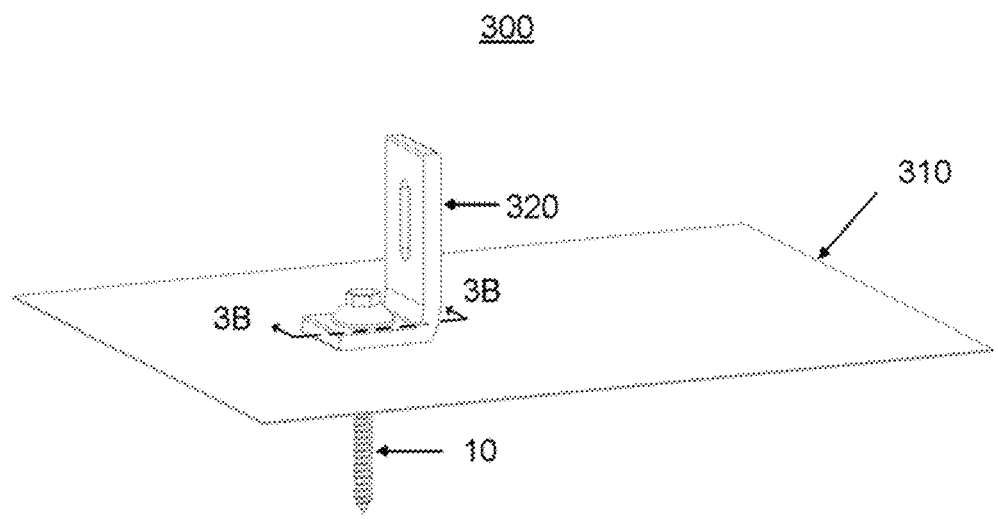
FIG. 3A illustrates a perspective view of a portion of a solar panel installation, in accordance with some embodiments.
Figure 3B:
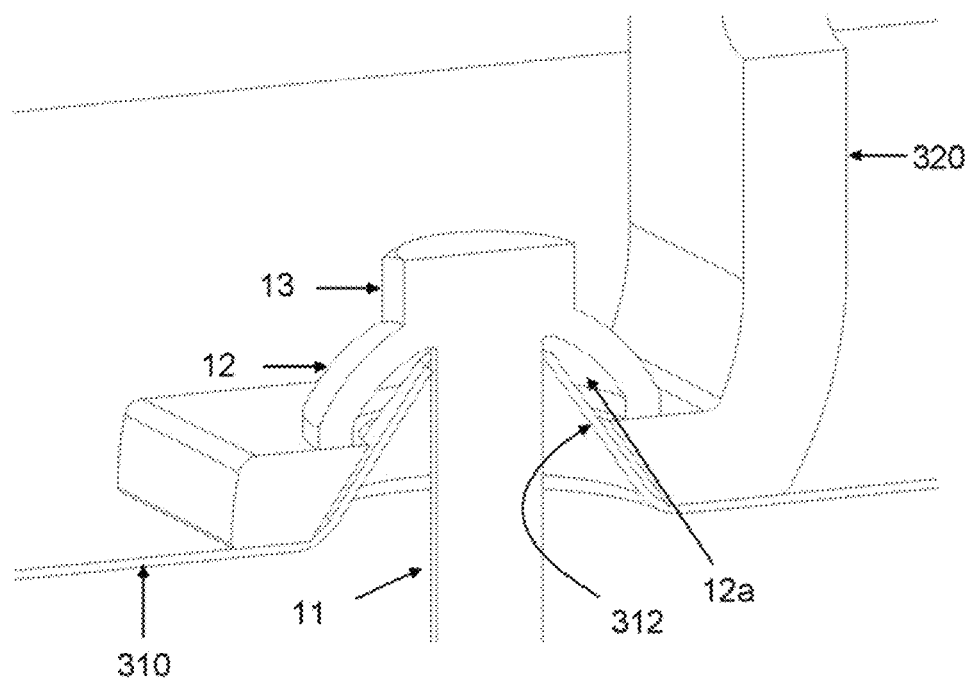
FIG. 3B illustrates a perspective cutaway view of the a solar panel installation of FIG. 3A, in accordance with some embodiments.

FIGS. 3A-3B illustrate perspective and perspective cutaway views, respectively, of a portion of solar panel installation system 300, in accordance with some embodiments. As shown, installation system 300 includes watertight fastening device 10, base plate 310, and solar panel module mount 320. Although not shown, it should be understood that the underside of base plate 310 rests on and engages the installation surface as installed. Watertight fastening device 10 extends through mount 320 and base plate 310, both having apertures through which shank 11 passes through as watertight fastening device 10 engages the installation surface to secure mount 320 against base plate 310 so that both are held in place without movement.

Base plate 310 includes an upwardly-extending protrusion 312 designed to extend into and fit within hollow region 12a, providing an enhanced barrier to an entry of moisture. In some embodiments, the width of a mount's aperture varies with the depth of the aperture. For example, as shown in FIG. 3B, the width of the aperture in mount 320 is smallest on the top surface and largest on the bottom surface, matching the conical shape of protrusion 312. It should be understood that protrusion 312 may be pre-formed before mounting mount 320 to the installation surface using watertight fastening device 10. Alternatively, protrusion 312 may be formed naturally while coupling watertight fastening device 10 to the installation surface.

Figure 4A:
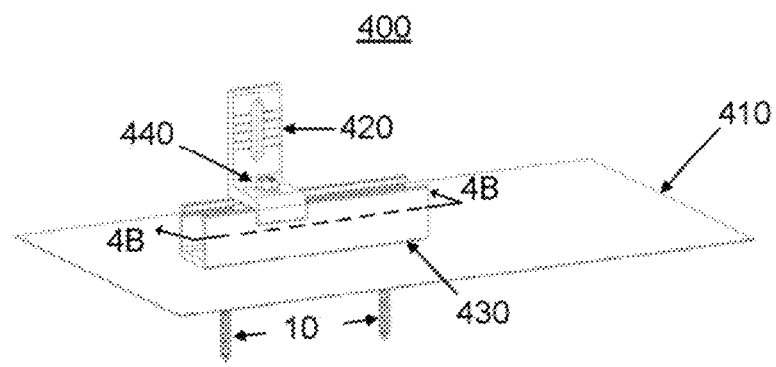
FIG. 4A illustrates a perspective view of a portion of a second solar panel installation, in accordance with some embodiments.
Figure 4B:
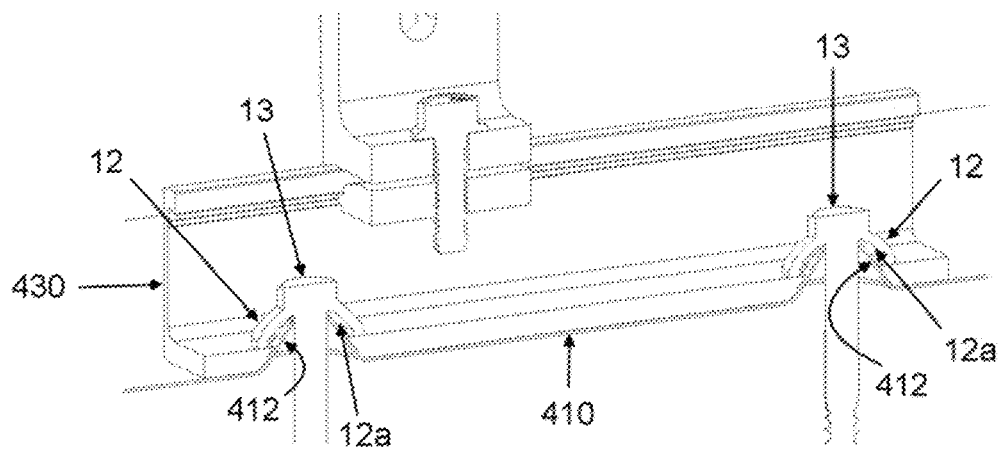
FIG. 4B illustrates a perspective cutaway view of the second solar panel installation system, in accordance with some embodiments.
Figure 4C:
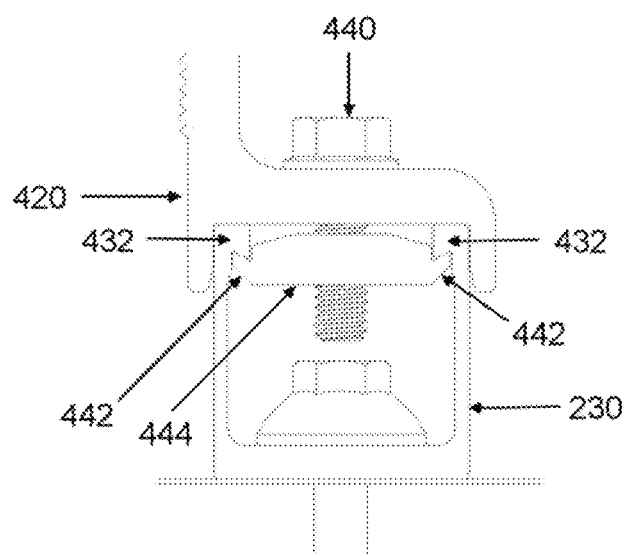
FIG. 4C illustrates a side elevation view of the second solar panel installation system, in accordance with some embodiments.

FIGS. 4A-4C illustrate perspective, perspective cutaway, and side views, respectively, of a portion of solar panel installation system 400, in accordance with some embodiments. Installation system 400 includes watertight fastening devices 10, base plate 410, solar panel module mount 420, mounting track 430, and fastener 440, where the underside of base plate 410 engages the installation surface. Although not shown, it should be understood that the underside of base plate 410 rests on and engages the installation surface as installed. Watertight fastening device 10 extends past mounting track 430 and base plate 410, both having apertures through which shank 11 extends as it engages the installation surface while securing mounting track 430 against base plate 410 so that both are held into place without movement.

In some configurations, mounting track 430 includes rails 432 designed to engage wing-like protrusions 442 of nut 444 to create a slidable engagement between mount 420 and mounting track 430 until a tightening force is applied to fastener 440, drawing nut 442 upward until flush with and engaged with rail 432.

Similar to base plate 310, base plate 410 includes an upwardly-extending protrusion 412 designed to extend into and fit within hollow region 12a, providing a secondary barrier to an entry of moisture. Watertight fastening device 10 extends past mounting track 430 and base plate 410, both having apertures through which shank 11 extends as watertight fastening device 10 engages the installation surface.

Figure 5A:
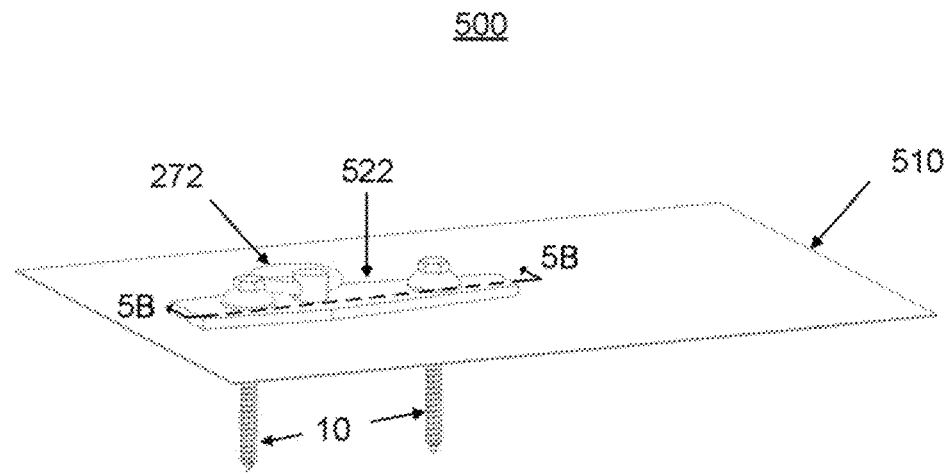
FIG. 5A illustrates a perspective view of a portion of a third solar panel installation system, in accordance with some embodiments.
Figure 5B:
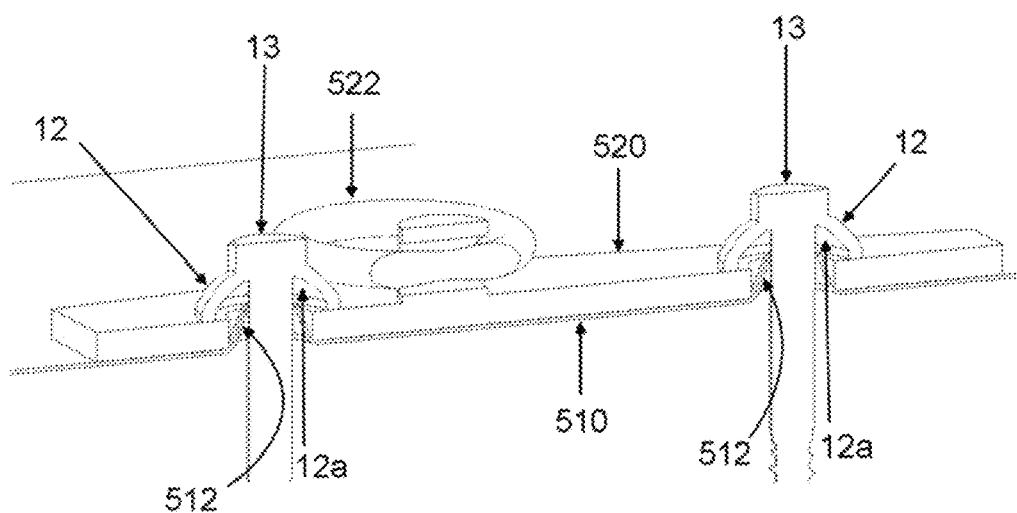
FIG. 5B illustrates a perspective cutaway view of the third solar panel installation system, in accordance with some embodiments.

FIGS. 5A-5B illustrate perspective and perspective cutaway views, respectively, of a portion of solar panel installation system 500, in accordance with some embodiments. As shown, installation system 500 could be coupled to an installation surface (not shown) and include more than watertight fastening device 10, base plate 510, anchor mount 520, and anchor 522, where the underside of base plate 510 engages the installation surface while securing anchor mount 520 against base plate 510 so that both are held into place without movement.

Similar to base plates 310 and 410, base plate 510 includes an upwardly-extending protrusion 512 designed to extend into and fit within hollow region 12a, providing a secondary barrier to an entry of moisture. Watertight fastening device 10 extends past anchor mount 520 and base plate 510, both having apertures through which shank 11 extends as watertight fastening device 10 engages the installation surface.

Figure 6A:
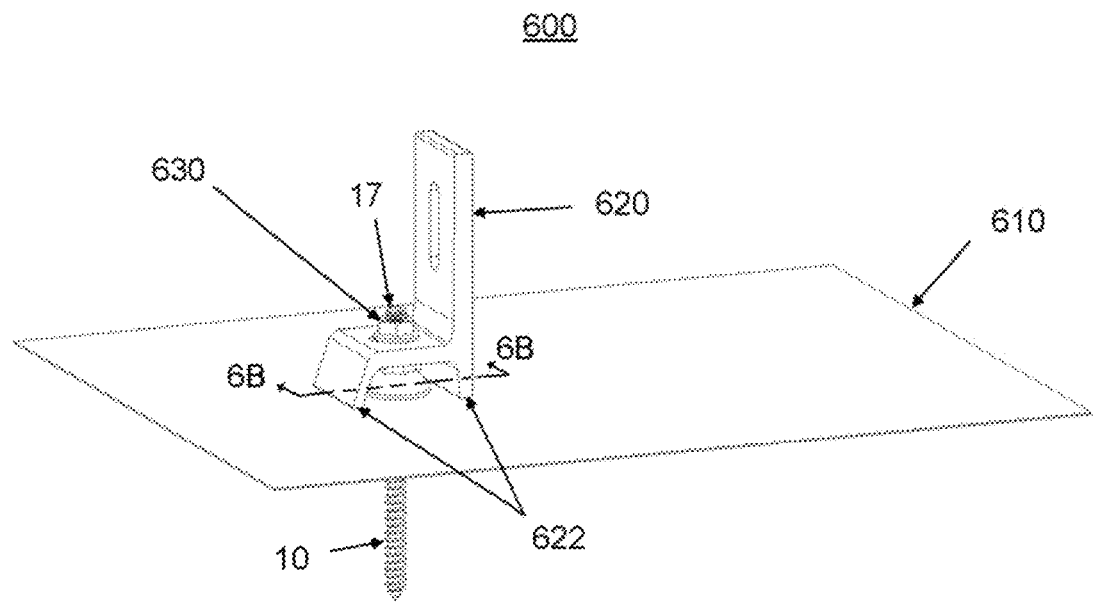
FIG. 6A illustrates a perspective view of a portion of a fourth solar panel installation system, in accordance with some embodiments.
Figure 6B:
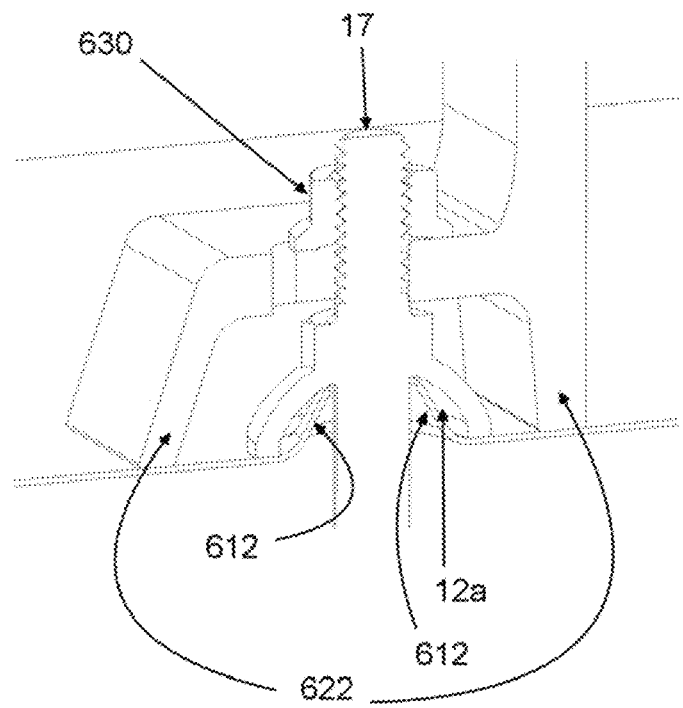
FIG. 6B illustrates a perspective cutaway view of the fourth solar panel installation system, in accordance with some embodiments.

FIGS. 6A-6B illustrate perspective and perspective cutaway views, respectively, of a portion of solar panel installation system 600, in accordance with some embodiments. As shown, installation system 600 could be coupled to an installation surface (not shown) and include watertight fastening device 10 with stud 17, base plate 610, raised solar panel module mount 620, and fastener 630, where the underside of base plate 610 engages the installation surface while securing watertight fastening device 100 against base plate 610 so that both are held into place without movement.

Similar to base plates 310, 410, and 510, base plate 610 includes an upwardly-extending protrusion 612 designed to extend into and fit within hollow region 12a, providing a secondary barrier to an entry of moisture. Prior to mount 620 being coupled to the installation surface, watertight fastening device 10 with stud 17 extends past base plate 610 having an aperture through which shank 11 extends as watertight fastening device 10 engages the installation surface.

Mount 620 includes legs 622 and an aperture located between legs 322. Once watertight fastening device 10 is engaged to the installation surface, mount 320 may be positioned on base plate 610 such that stud 17 extends through the aperture of mount 620. Then, fastener 630 may be positioned on stud 17 from where a force may be applied to fastener 630 to couple mount 620 to the installation surface while securing mount 620 against base plate 610 so that both are held into place without movement.

In some embodiments, fastener 630 and stud 17 may be threaded to facilitate a threadable engagement between fastener 330 and stud 17. In some embodiments, the aperture and stud 17 may be threaded to facilitate a threadable engagement between the aperture and stud 17.

Figure 7A:
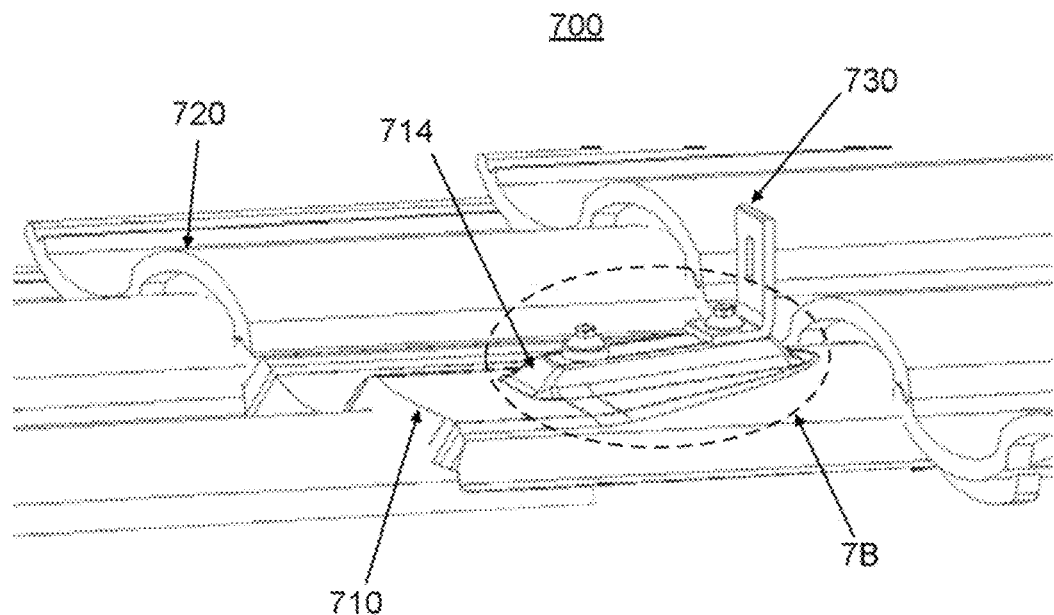
FIG. 7A illustrates a perspective view of a portion of a fifth fastening solar panel installation system, in accordance with some embodiments.
Figure 7B:
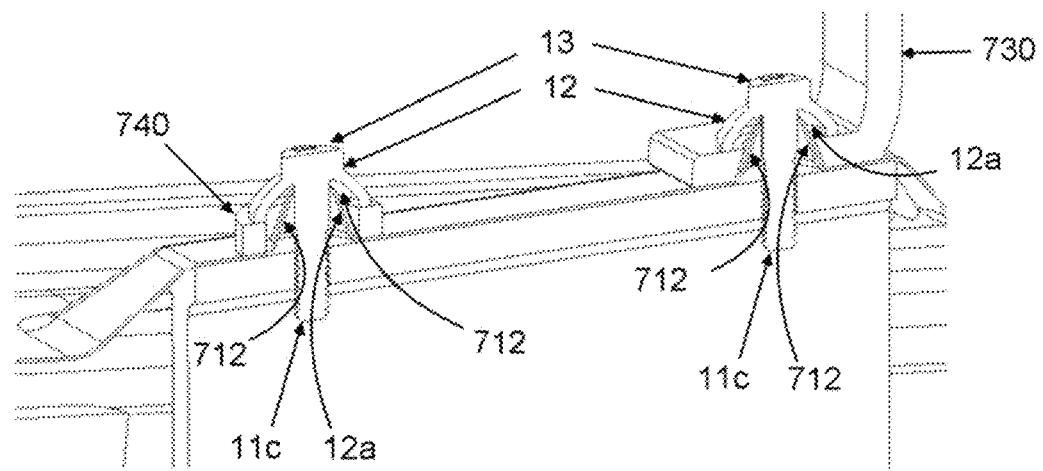
FIG. 7B illustrates a perspective cutaway view of the fifth solar panel installation system, in accordance with some embodiments.

FIGS. 7A-7B illustrate perspective and perspective cutaway views, respectively, of a portion of solar panel installation system 700, in accordance with some embodiments. As shown, installation system 700 could be coupled to an installation surface such as, for example, ceramic roof tiles 720 and include more than watertight fastening device 10, base plate 710, and mount 730.

Base plate 710 includes a raised portion or component 714 that may positioned above the curvature of the roof surface and mounted. Raised component 714 includes at least one upwardly-extending protrusion 712 designed to extend into and fit within hollow region 12a, providing a secondary barrier to an entry of moisture. In some embodiments, raised portion or component 714 may be designed with additional structure under protrusion 712 sufficient to include an aperture through which watertight fastening device 10 passes. In some embodiments, tip 11c of shank 11 may be flat and not pointed as shown. In some embodiments, spacer 740 may be placed outside of protrusion 712 in the absence of mount 730 to provide a surface onto which fastener 10 may distribute a tightening force applied to head 13.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A solar panel installation system, comprising:
a base plate, comprising:
 a lower surface and an upper surface, wherein the lower surface is configured to be positioned against an installation surface;
 a protrusion extending away from the upper surface of the base plate; and
 a base plate aperture situated concentrically with respect to the protrusion;
a fastening device, comprising:
 a head;
 a shank extending away from the head toward a first distal end;
 a threaded stud extending away from the head in a direction opposing the shank toward a second distal end;
 a nut configured to threadably engage the threaded stud; and
 a cover extending outwardly and away from the head in the direction of the shank and defining a hollow region between the shank and an inner surface of the cover, wherein the hollow region is configured to envelop the protrusion when a first tightening force is applied to the fastening device extending through the base plate aperture until the cover is secured to the base plate, and wherein the cover is configured to prevent ingress of moisture beneath the fastening device when secured to the base plate; and
a mount comprising a pair of opposing legs between which an aperture of the mount is located, wherein the mount is positioned atop the base plate and secured against the base plate through the pair of opposing legs, wherein the nut threadably engages the threaded stud extending through the aperture of the mount when a second tightening force is applied to the nut until the mount is secured against the base plate.

2. The solar panel installation system of claim 1, wherein the first tightening force is applied to the head of the fastening device.

3. The solar panel installation system of claim 1, wherein a width of the aperture of the mount varies to match a shape of the protrusion.

4. The solar panel installation system of claim 1, further comprising:
   a moisture-blocking insert, wherein the first distal end is further inserted through an aperture of the moisture-blocking insert.

5. A method for employing a watertight fastener in a solar panel installation system, comprising:
   positioning a base plate against an installation surface, the base plate comprising:
   a protrusion extending away from the base plate in a first direction; and
   a base plate aperture situated concentrically with respect to the protrusion;
   inserting a distal end of a shank of a fastening device through the base plate aperture and the protrusion, the fastening device comprising:
   a head;
   the shank, wherein the shank extends away from the head toward the distal end of the shank;
   a threaded stud extending away from the head in a direction opposing the shank toward a distal end;
   a nut configured to threadably engage the threaded stud; and
   a cover extending outwardly and away from the head in the direction of the shank and defining a hollow region between the shank and an inner surface of the cover;
   applying a first tightening force to the fastening device until the hollow region envelops the protrusion as the first tightening force is being applied until the cover is secured to the base plate, thereby preventing an ingress of moisture beneath the fastening device;
   positioning a mount atop the base plate, the mount comprising a pair of opposing legs between which an aperture of the mount is located, wherein the distal end of the threaded stud extends through the aperture of the mount and the mount is secured against the base plate through the pair of opposing legs;
   threadably engaging the nut with the threaded stud; and
   applying a second tightening force to the nut until mount is secured against the base plate.

6. The method of claim 5, wherein the first tightening force is applied to the head of the fastening device.

7. The method of claim 5, wherein the distal end of the shank extends through an aperture of a moisture-blocking insert.

8. The method of claim 5, wherein a width of the aperture of the mount varies to match a shape of the protrusion.

* * * * *